US011802706B1

(12) United States Patent
Zhao et al.

(10) Patent No.: US 11,802,706 B1
(45) Date of Patent: Oct. 31, 2023

(54) METHODS FOR DETERMINING ENERGY SAVING AMOUNT, THERMOSTATS AND STORAGE MEDIUMS

(71) Applicant: Degrii Co., Ltd., Jiangsu (CN)

(72) Inventors: Ye Zhao, Jiangsu (CN); Yuejun Yu, Jiangsu (CN); Di Wang, Jiangsu (CN); Fei Zhao, Jiangsu (CN)

(73) Assignee: Degrii Co., Ltd., Suzhou (CN)

( * ) Notice: Subject to any disclaimer, the term of this patent is extended or adjusted under 35 U.S.C. 154(b) by 0 days.

(21) Appl. No.: 18/100,234

(22) Filed: Jan. 23, 2023

(30) Foreign Application Priority Data

Nov. 1, 2022 (CN) .......................... 202211358565.8

(51) Int. Cl.
  *F24F 11/46* (2018.01)
  *F24F 11/65* (2018.01)
  *G05B 19/042* (2006.01)

(52) U.S. Cl.
  CPC .............. *F24F 11/46* (2018.01); *F24F 11/65* (2018.01); *G05B 19/042* (2013.01); *G05B 2219/2614* (2013.01)

(58) Field of Classification Search
  None
  See application file for complete search history.

(56) References Cited

U.S. PATENT DOCUMENTS

| 10,584,890 B2 | 3/2020 | Steinberg et al. | |
| 10,754,405 B1* | 8/2020 | Picardi | G06F 1/263 |
| 2008/0217419 A1* | 9/2008 | Ehlers | G08B 21/20 236/44 C |
| 2011/0160913 A1* | 6/2011 | Parker | F24D 19/1048 700/291 |
| 2012/0310416 A1* | 12/2012 | Tepper | F24F 11/30 700/286 |
| 2013/0063756 A1* | 3/2013 | Gray | G06F 1/3284 358/1.14 |
| 2015/0163945 A1* | 6/2015 | Barton | G08B 5/36 361/809 |
| 2019/0234637 A1* | 8/2019 | Bentz | F24F 11/63 |
| 2020/0141603 A1* | 5/2020 | Brahme | G05B 13/048 |
| 2021/0294283 A1* | 9/2021 | Hummon | G05B 15/02 |

FOREIGN PATENT DOCUMENTS

CN  108536188 B  6/2021

* cited by examiner

*Primary Examiner* — Thomas C Lee
*Assistant Examiner* — Anzuman Sharmin
(74) *Attorney, Agent, or Firm* — The Small Patent Law Group LLC; Christopher R. Carroll

(57) ABSTRACT

The present disclosure provides a thermostat applied to a heating, ventilation and air conditioning (HVAC) system including: a memory storing machine executable instructions; one or more processors, wherein when the machine executable instructions are executed, the one or more processors are configured to perform the following operations: obtaining device information of the HVAC system, and region information of a user's location; according to the device information of the HVAC system and the region information, in response to an energy saving mode and a schedule selected by the user, determining a predicted energy consumption and a reference energy consumption; and determining energy saving amount according to the predicted energy consumption and the reference energy consumption.

15 Claims, 3 Drawing Sheets

METHODS FOR DETERMINING ENERGY SAVING AMOUNT, THERMOSTATS AND STORAGE MEDIUMS

CROSS REFERENCE TO RELATED APPLICATIONS

This application claims priority to Chinese Patent Application No. 202211358565.8 filed on Nov. 1, 2022, the entire content of which is incorporated herein by reference.

TECHNICAL FIELD

The present disclosure relates to a technical field of electrical appliance control, and in particular to methods for determining energy saving amount, thermostats and storage mediums.

BACKGROUND

With the increasing awareness of energy saving, users are more and more concerned about the energy consumption when using electrical appliances. In general, users can achieve energy saving by setting the energy saving mode for electrical appliances, for example, users can adjust the energy saving mode of heating, ventilation and air conditioning (HVAC) system by setting the thermostat, but users do not know the energy saving effect of the set energy saving mode.

SUMMARY

To overcome the problems in the related arts, the present disclosure provides a method for determining energy saving amount, a thermostat and a storage medium.

According to a first aspect of the present disclosure, a thermostat applied to a heating, ventilation and air conditioning (HVAC) system is provided, the thermostat includes: a memory storing machine executable instructions; one or more processors, wherein when the machine executable instructions are executed, the one or more processors are configured to perform the following operations including: obtaining device information of the HVAC system, and region information of a user's location; according to the device information of the HVAC system and the region information, in response to an energy saving mode and a schedule selected by the user, determining a predicted energy consumption and a reference energy consumption ; determining energy saving amount according to the predicted energy consumption and the reference energy consumption.

According to a second aspect of the present disclosure, a method for determining energy saving amount, applied to a thermostat or a user terminal, is provided including: obtaining device information of HVAC system, and region information of a user's location; according to the device information of the HVAC system and the region information, in response to an energy saving mode and a schedule selected by the user, determining a predicted energy consumption and a reference energy consumption; determining the energy saving amount according to the predicted energy consumption and the reference energy consumption.

According to a third aspect of the present disclosure, a non-transitory computer readable storage medium is provided including computer program instructions stored thereon, wherein the computer program instructions, when executed by a processor, achieve the method described in any of the embodiments of the present disclosure.

The technical solutions provided by the present disclosure may include the following beneficial effects: the device information of the HVAC system and the region information of the user's location are obtained, in the case of obtaining the energy saving mode and schedule selected by the user, based on the predicted energy consumption and the reference energy consumption corresponding to the energy saving mode and the schedule, the user can know the energy that can be saved under the energy saving mode.

It should be understood that the above general description and the following detailed descriptions are exemplary and explanatory only, and are not restrictive on the present disclosure.

BRIEF DESCRIPTION OF DRAWINGS

Accompanying drawings herein are incorporated into and constitute a part of the specification, illustrate embodiments consistent with the present disclosure, and are combined with the description to explain the technical solutions of the present disclosure.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. Embodiments described in the illustrative examples below are not intended to represent all embodiments consistent with the present disclosure. Rather, they are merely embodiments of devices and methods consistent with some aspects of the present disclosure as recited in the appended claims.

Terms used in the present disclosure is only for the purpose of describing particular embodiments and is not intended to limit the present disclosure. As used in the present disclosure and the appended claims, the singular forms "a", "said" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "upon", "when" or "in response to determining".

In order to enable users to know the energy saving effect that the selected energy saving mode can achieve, the present disclosure provides a method for determining the energy saving amount, which can be applied to a thermostat or a user terminal, and the thermostat can be used for controlling the HVAC system.

The following embodiments will illustrate the method for determining the energy saving amount provided by the present disclosure in conjunction with the accompanying drawings.

Figure 1:
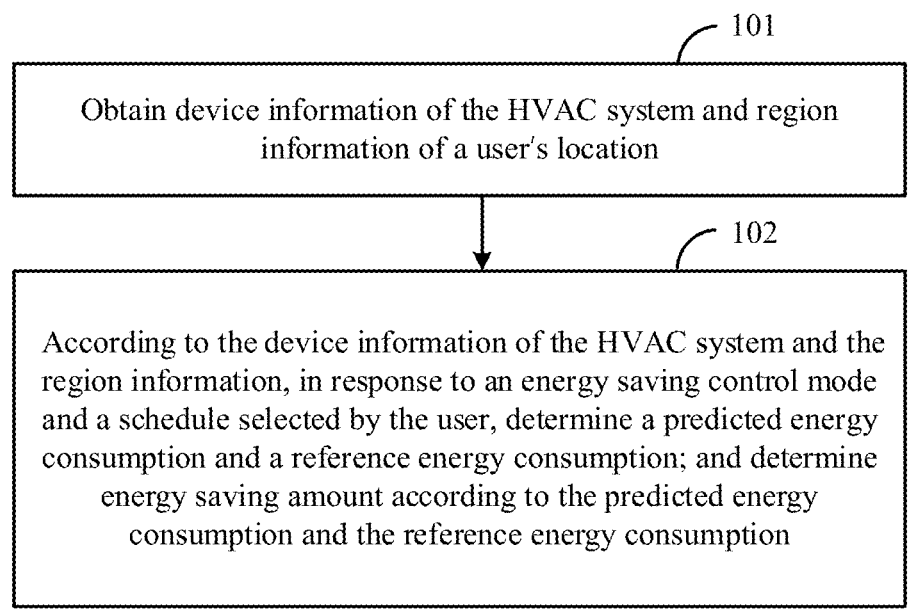
FIG. 1 is a flow chart of a method for determining energy saving amount according to an exemplary embodiment of the present disclosure.

FIG. 1 is a flow chart of a method for determining energy saving amount according to an exemplary embodiment of the present disclosure, as shown in FIG. 1, the method for determining the energy saving amount includes step 101 and step 102.

In step 101, device information of the HVAC system and region information of the user's location are obtained.

In some embodiments, device information of the HVAC system and region information of the user's location can be obtained by receiving the user's response to a query message. For example, the query message may include "Please enter your city" and "Please enter the device model".

Where the device information can include a brand and a model of the HVAC system, the age and area of the house where the HVAC system is installed and the energy source driving the HVAC system, and the region information can include a city name or a zip code, etc.

In some embodiments, the region information may be further divided into first region information entered by the user and second region information determined according to the region information entered by the user. When the first region information (e.g., the city name and/or the zip code) entered by the user is obtained, the second region information of the region corresponding to the first region information can be determined according to the city name and/or zip code. In some embodiments, the second region information of the location may include one or more of climate type, thermal division, standard building type, or weather information of the region.

In some embodiments, according to the user's location, a nearest city in a database that is in the same climate zone may be selected, and the desired region information may be simulated by a method such as a difference calculation.

In step 102, in response to a schedule and the energy saving mode selected by the user, based on the device information of the HVAC system and the region information, a predicted energy consumption and a reference energy consumption are determined, and the energy saving amount is determined according to the predicted energy consumption and the reference energy consumption.

In embodiments of the present disclosure, multiple energy saving modes may be provided for users to choose, each energy saving mode corresponds to multiple working modes, and different working modes correspond to different run durations and temperature control ranges.

For each working mode, based on the energy saving mode selected by the user, the temperature control range can be adjusted, and based on the schedule selected by the user, the run duration can be adjusted. Therefore, the energy consumption of the working mode can be predicted based on the temperature control range and the run duration. That is, if the user selects an energy saving mode and a schedule, the corresponding predicted energy consumption can be determined.

In one implementation, the energy saving amount can be determined from the difference between the predicted energy consumption and the reference energy consumption, thereby reflecting the energy saving effect of the energy saving mode selected by the user.

In another implementation, the energy saving amount can be determined from the ratio of the difference between the predicted energy consumption and the reference energy consumption to the reference energy consumption, thereby reflecting the energy saving effect of the energy saving mode selected by the user.

In the embodiments of the present disclosure, by obtaining the device information of the HVAC system, and the region information of the user's location, in the case of obtaining the energy saving mode and the schedule selected by the user, based on the device information of the HVAC system and the region information, a difference between the predicted energy consumption and the reference energy consumption are determined, such that the user can know the energy amount that can be saved under the energy saving mode.

The reference energy consumption in the embodiments of the present disclosure can be determined according to reference temperature control ranges corresponding to different working mode and the default run durations thereof within a preset period, and the reference temperature control ranges and default run durations are determined according to the region information.

That is, the weather information for the region can be obtained based on the region information, and the reference temperature control range corresponding to each working mode can be determined based on the weather information and a relevant standard (ASHRAE Standard 55-2010). Where the working modes can include home mode, away mode and sleep mode.

For example, the reference temperature control ranges for a certain region under the above working modes is shown in Table 1.

TABLE 1

| Working Mode | Reference Temperature Control Range/° F. | ° C. |
| --- | --- | --- |
| Home Mode | 70~76 | 21.11~24.44 |
| Away Mode | 56~82 | 13.33~27.78 |
| Sleep Mode | 72~78 | 22.22~25.56 |

In embodiments of the present disclosure, a default run duration of each working mode can be predetermined. Assuming that the preset period is one day, the default run duration of each working mode in one day can be set to 8 hours.

In embodiments of the present disclosure, the predicted energy consumption can be determined based on the target temperature control ranges and the target run durations corresponding to respective working modes, where the target temperature control ranges are determined based on the energy saving mode selected by the user, and the target run durations are determined based on the schedule.

In embodiments of the present disclosure, the reference energy consumption and the predicted energy consumption are further determined according to the weather information in the device information and the region information. Where the differential temperature between indoor and outdoor can be determined based on the weather information, and the reference energy consumption and the predicted energy consumption can be determined based on the differential temperature between indoor and outdoor.

In some embodiments, energy savings can be achieved by adjusting a reference temperature control range corresponding to a working mode. That is, if the reference temperature control range maintained under the corresponding working mode is narrower, the HVAC system consumes more energy to maintain the temperature within the reference temperature control range. For example, the reference temperature control range in home mode is from 21.11° C. to 24.44° C., and the HVAC system starts to work when the indoor temperature is lower than 21.11° C. or higher than 24.44° C. Assuming that the adjusted temperature control range in home mode is from 20° C. to 25.6° C., the HVAC system starts to work when the indoor temperature is lower than 20° C. or higher than 25.6° C. In other words, when the indoor temperature is out the adjusted temperature control range, the HVAC system needs to work; when the indoor temperature is within the adjusted temperature control range, the HVAC system does not need to work. For the same working mode, the adjusted temperature control range is wider than the reference temperature control range, and therefore, energy consumption can be saved.

To differentiate from the reference temperature control range corresponding to the working mode, the adjusted temperature control range corresponding to the working mode is expressed as a target temperature control range.

In some embodiments, the reference temperature control range for each working mode may be adjusted according to different differential temperatures to obtain target temperature control ranges under different energy saving modes. For example, the energy saving mode can include low energy saving mode, medium energy saving mode and high energy saving mode. The adjusted differential temperature for the reference temperature control range in the low energy saving mode is smaller than that in the medium energy saving mode. The adjusted differential temperature for the reference temperature control range in the medium energy saving mode is smaller than that in the high energy saving mode. In other words, for each working mode, a target temperature control range in the low energy saving mode is smaller than that in the medium energy saving mode, and a target temperature control range in the medium energy saving mode is smaller than that in the high energy saving mode.

As shown in Table 2, the reference temperature control ranges of different working modes under each energy saving mode are adjusted using different differential temperatures to obtain the target temperature control ranges.

TABLE 2

| Working Mode | Low Energy saving mode | Medium Energy saving mode | High Energy saving mode |
|---|---|---|---|
| Differential temperature/° F. | 1 | 2 | 3 |
| Target Temperature Control Range (Home)/° F. | 69~77 | 68~78 | 67~79 |
| Target Temperature Control Range (Away)/° F. | 55~83 | 54~84 | 53~85 |
| Target Temperature Control Range (Sleep)/° F. | 71~79 | 70~80 | 69~81 |
| Target Temperature Control Range (Home)/° C. | 20.56~25.00 | 20~25.56 | 19.44~26.11 |
| Target Temperature Control Range (Away)/° C. | 12.78~28.33 | 12.22~28.89 | 11.67~29.44 |
| Target Temperature Control Range (Sleep)/° C. | 21.67~26.11 | 21.11~26.67 | 20.56~27.22 |

In some embodiments, in response to the user selecting the low energy saving mode, the target temperature control ranges corresponding to different working modes under the low energy saving mode are obtained;

in response to the user selecting the medium energy saving mode, the target temperature control ranges corresponding to different working modes in the medium energy saving mode are obtained; and in response to the user selecting the high energy saving mode, the target temperature control ranges corresponding to the different working modes under the high energy saving mode are obtained.

When the user's selection of low energy saving mode, medium energy saving mode or high energy saving mode is obtained, but the schedule set by the user is not obtained, a run duration corresponding to each working mode may adopt a default run duration.

When the user's selection of low energy saving mode, medium energy saving mode or high energy saving mode is obtained, and the schedule set by the user is obtained, the run durations corresponding to different working modes can be adjusted according to the user's schedule, that is, the target run duration corresponding to each working mode can be determined according to the user's schedule.

The following embodiments take a method for determining energy saving mount applied to a user terminal as an example, and specific description will be stated in conjunction with the accompanying drawings.

Figure 2:
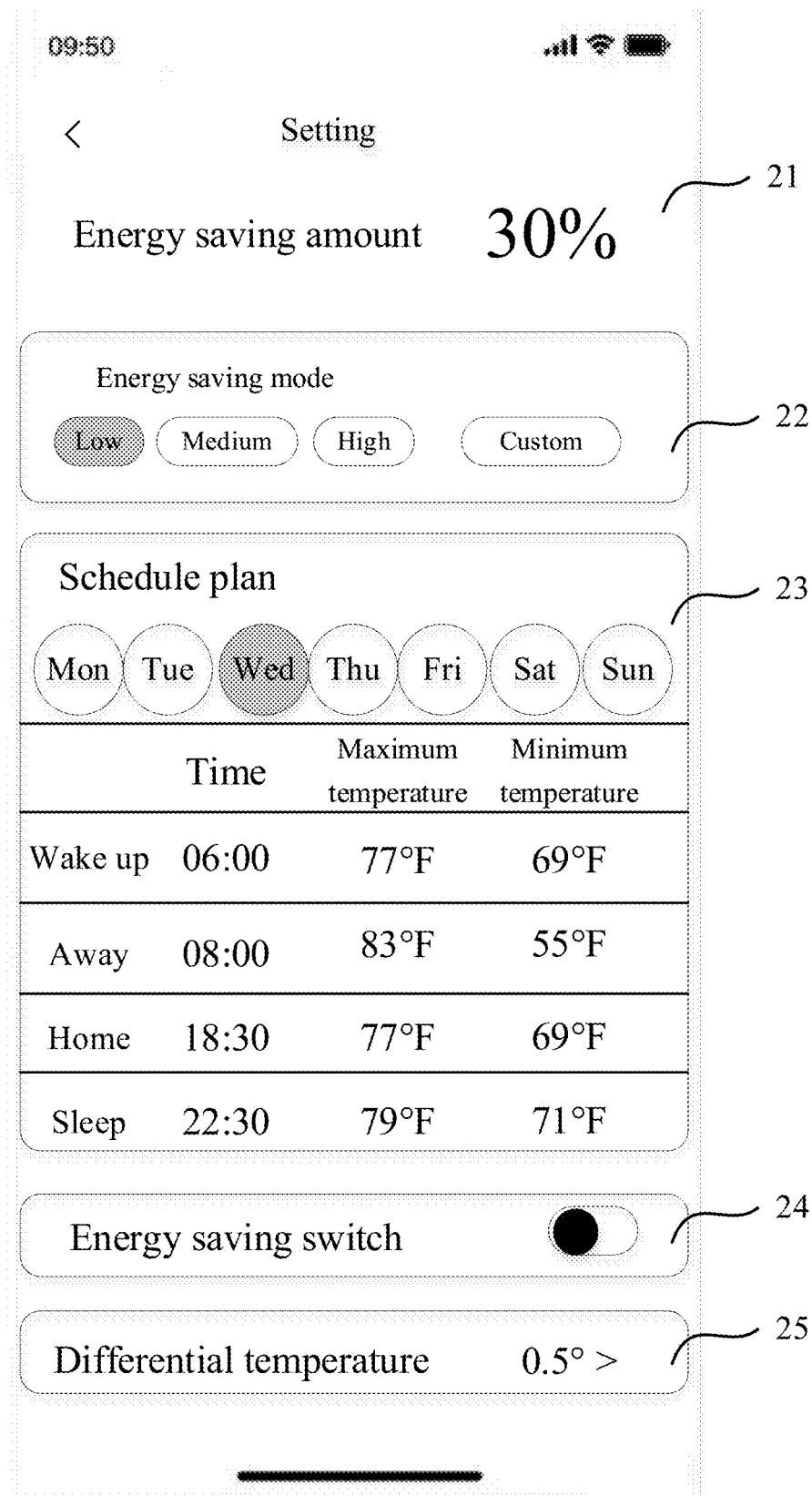
FIG. 2 is a schematic diagram of an energy saving mode for user selection according to an exemplary embodiment of the present disclosure.

FIG. 2 is a schematic diagram of an energy saving mode for user selection according to an exemplary embodiment of the present disclosure. As shown in FIG. 2, the corresponding energy saving amount can be displayed at region 21 in response to the energy saving mode selected by the user. The energy saving modes for the user to select are displayed at region 22, with "low" indicating low energy saving mode, "medium" indicating medium energy saving mode, "high" indicating high energy saving mode, and "custom" indicating that the user can customize the energy saving mode. When the user selects the low energy saving mode, the medium energy saving mode or the high energy saving mode, the differential temperature in region 25 cannot be edited.

When the user selects low energy saving mode, medium energy saving mode or high energy saving mode, the default run durations and target temperature control ranges are displayed in region 23. The user can edit the wake up time, go out time, get home time and sleep time according to their schedule, and the target run durations of home mode, sleep mode and away mode are determined according to the time edited by the user.

In some embodiments, the user can customize the energy saving mode by customizing the target temperature control ranges or differential temperature, that is, in response to the custom energy saving mode selected by the user, user-defined differential temperature or user-defined target temperature control ranges are obtained. When the user-defined differential temperature is obtained, the target temperature control ranges are adjusted according to the user-defined differential temperature, to obtain the target temperature control ranges corresponding to different working modes under the custom energy saving mode.

As shown in FIG. 2, in response to the user selected "custom" option, the user can customize the energy saving mode by editing a maximum and a minimum of the temperature range, and also by adjusting the differential temperature displayed in region 25. Thus, maximum temperature and minimum temperature edited by the user or differential temperature adjusted by the user can be obtained. The target temperature control ranges can be determined based on the adjusted differential temperature.

In some embodiments, in response to the energy saving command issued by the user, the run durations for respective working modes are proportionally adjusted, to extend the run duration of the away mode and shorten the run duration of the home mode. When it is detected that the user turns on the energy saving switch (Coast to cool) and the energy saving command issued by the user is detected, the run duration corresponding to each working mode can be proportionally adjusted, or can also be adjusted to the preset run duration.

As shown in FIG. 2, if detecting that the user turns on the energy saving switch 24, it is determined that the energy saving command issued by the user is detected, the run duration corresponding to each working mode is adjusted proportionally.

If the user selects the low energy saving mode, medium energy saving mode or high energy saving mode, a run duration for each working mode can be obtained. For example, the run durations for home mode, away mode and sleep mode are all 8 hours. When detecting that the user turns on the energy saving switch, the run duration for home mode can be proportionally shortened to 6 hours, the run duration for away mode can be extended to 12 hours, and the run duration for sleep mode is 6 hours.

In some embodiments, a weight corresponding to each working mode can be obtained; the predicted energy consumption corresponding to the energy saving mode can be determined based on the target temperature control ranges, the target run durations, and the weights corresponding to different working modes.

In an embodiment, a weight corresponding to each working mode can be determined by the proportion of the run duration to the preset period. For example, assuming that the preset period is one day, the run durations of the HVAC system in home mode, away mode and sleep mode are for the same length, in this case, the ratios of the run durations of home mode, away mode and sleep mode separately to one day is 1/3, i.e. the weight corresponding to each working mode is 0.51.

In another embodiment, the weight of each working mode can be set in advance. For example, the weight of home mode can be set to 1.01, the weight of away mode to 0.19, and the weight of sleep mode to 0.95.

In another embodiment, for each working mode, a time length parameter used for increasing or decreasing the run duration can be set in advance. For example, the run duration corresponding to home mode can be set to decrease by 30 minutes, the run duration corresponding to away mode to increase by 30 minutes, and the run duration corresponding to sleep mode to remain unchanged.

In some embodiments, in order to improve the accuracy of determining the energy consumption, the energy consumption coefficient can be taken into account when calculating the energy consumption, where the energy consumption coefficient is configured to indicate how the construction thermal parameters affect the energy consumption in different periods. In order to improve the accuracy of determining the energy consumption, the heating coefficient of performance (COP) corresponding to the energy source for driving the HVAC system may further be considered when calculating the energy consumption. When it is detected that the energy source for driving the HVAC system is an energy source that out of a list of specified energy source, the heating COP corresponding to the energy source for driving the HVAC system is obtained according to the energy conversion relationship table.

Wherein the specified energy source may be a primary energy source, as shown in Table 3, and the heating COP corresponding to the energy source for driving the HVAC system may be obtained according to the conversion coefficient in the energy conversion relationship table.

TABLE 3

|  | Conversion Coefficient |
| --- | --- |
| Electricity | 3.167 |
| Natural Gas | 1.084 |
| Area Cooling | 1.056 |
| District Heating | 3.613 |
| Steam | 1.200 |
| Gasoline | 1.050 |
| Diesel | 1.050 |
| Kerosene | 1.050 |
| Fuel Oil No. 1 | 1.050 |
| Fuel Oil No. 2 | 1.050 |
| Propane | 1.050 |
| Other Fuels 1 | 1.000 |
| Other Fuels 2 | 1.000 |

Figure 3:
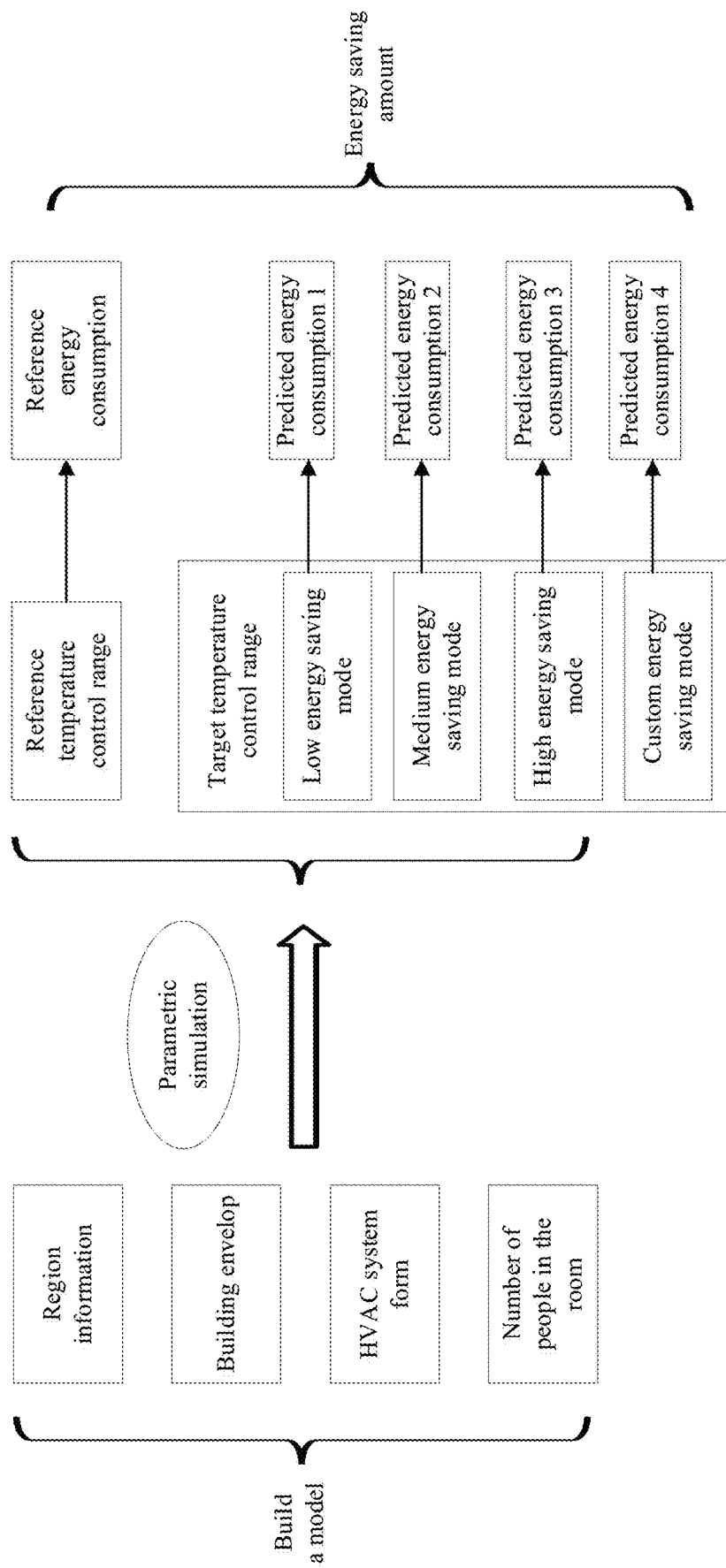
FIG. 3 is a schematic diagram of determining energy saving amount through a model according to an exemplary embodiment of the present disclosure.

In the embodiments of the present disclosure, the energy saving amount can be determined by a pre-constructed model. FIG. 3 is a schematic diagram of determining energy-saving amount through a model according to an exemplary embodiment of the present disclosure. As shown in FIG. 3, the model can be built according to the region information, building envelope, HVAC system form and the number of people in the room. With this model, the reference energy consumption can be determined based on the reference temperature control ranges, and the predicted energy consumption can be determined based on the target temperature control ranges. The energy saving effect of the energy saving mode can be determined by the predicted energy consumption and the reference energy consumption.

The region information, building envelope, HVAC system form, and number of people in the room can be determined by the user's response to the query information.

The building envelope is the envelope of the house where the HVAC system is installed. The building envelope can include both transparent and opaque parts: opaque envelope includes walls, roofs and floor slabs, etc., and transparent envelope includes windows, skylights and balcony doors, etc.

The HVAC system form can match the heat pump/non-heat pump in the database according to the user settings, where the COP of the heat pump is 3.0 by default and the heating heat source in the non-heat pump can be set with an efficiency to correspond to different fuel supplies.

In some embodiments, the region information, envelope, HVAC system form, and number of people in the room can be obtained when the user associates the thermostat or user terminal with the HVAC system. Based on the acquired information, the reference energy consumption is determined, and the target temperature control range corresponding to each working mode under the low energy saving mode, medium energy saving mode and high energy saving mode is obtained. For each energy saving mode, the predicted energy consumption is determined based on the target temperature control ranges and the default run duration corresponding to the working modes. Based on the reference energy consumption and the predicted energy consumption, the energy saving amount corresponding to each energy saving mode can be determined and stored into the database.

In response to detecting that the user has selected the low energy saving mode, medium energy saving mode or high energy saving mode, the energy saving mount in the database can be directly retrieved for display.

In response to detecting the schedule set by the user, the run duration corresponding to each working mode under the selected energy saving mode is adjusted to obtain the target run duration. The predicted energy consumption is recalculated based on the target run durations for respective working modes, and the energy saving amount is determined based on the recalculated predicted energy consumption and the reference energy consumption.

In response to detecting that the user has selected the "custom" option, the energy saving amount can be calculated by interpolation based on the samples in the database after detecting that the user has set the temperature ranges under home, away and sleep modes.

Corresponding to the above embodiment of the method, the present disclosure also provides a thermostat applied to a HVAC system, where the thermostat includes a memory storing machine executable instructions and one or more processors, and when executing the machine executable instructions, the one or more processors are configured to execute any method described in the present disclosure.

At least one embodiment of the present disclosure further provides a computer readable storage medium on which a computer program is stored, and when the program is executed by a processor, the method for determining energy saving amount in any embodiment of the present disclosure is implemented.

As will be understood by the skilled in the art, one or more embodiments of the present disclosure may be provided as a method, system or computer program product. Accordingly, one or more embodiments of the present disclosure may take the form of an entirely hardware embodiment, an entirely software embodiment, or an embodiment combining software and hardware aspects. Furthermore, one or more embodiments of the present disclosure may employ the form of a computer program product implemented on one or more computer-usable storage media (including, but not limited to, disk storage, CD-ROM, optical storage, etc.), where the one or more computer-usable storage media having computer-usable program code.

"And/or" in the present disclosure means at least one of the two, for example, "A and/or B" includes three schemes: A, B, and "A and B".

The various embodiments in the present disclosure are described in a progressive manner, and the same or similar parts between the various embodiments may be referred to each other, and each embodiment focuses on the differences from other embodiments. In particular, for the data processing apparatus embodiment, since it is basically similar to the method embodiment, the description is relatively simple, and for related parts, please refer to the partial description of the method embodiment.

The foregoing describes specific embodiments of the present disclosure. Other embodiments are within the scope of the appended claims. In some cases, the acts or steps recited in the claims can be performed in an order different from that in the embodiments and still achieve desirable results. Additionally, the processes depicted in the figures do not necessarily require the shown particular order or sequential order, to achieve desirable results. In some embodiments, multitasking and parallel processing are also possible or may be advantageous.

Embodiments of the subject matter and functional operations described in the present disclosure can be implemented in digital electronic circuitry, tangible computer software or firmware, computer hardware including the structures disclosed in the present disclosure and their structural equivalents, or a combination of one or more thereof. Embodiments of the subject matter described in the present disclosure may be implemented as one or more computer programs, i.e., one or more of modules in computer program instructions encoded on a tangible, non-transitory program carrier to be executed by a data processing apparatus, or to control the operation of the data processing apparatus. Alternatively or additionally, the program instructions may be encoded on an artificially generated propagating signal, such as a machine-generated electrical, optical or electromagnetic signal, which is generated to encode and transmit information to a suitable receiver device to be executed by the data processing device. The computer storage medium may be a machine-readable storage device, a machine-readable storage substrate, a random or serial access memory device, or a combination of one or more thereof The processes and logic flows described in the present disclosure can be performed by one or more programmable computers executing one or more computer programs to perform corresponding functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, for example, general and/or special purpose microprocessors, or any other type of central processing unit. Typically, the central processing unit will receive instructions and data from read only memory and/or random access memory. The basic components of a computer include a central processing unit for implementing or executing instructions and one or more memory devices for storing instructions and data. Typically, a computer also includes one or more high-capacity storage devices for storing data, such as magnetic, magneto-optical or optical disks, or a computer is operably coupled to the high-capacity storage devices to receive data therefrom or transfer data thereto, or both. However, the computer does not have to have such a device. Furthermore, the computer may be embedded in another device such as a mobile phone, personal digital assistant (PDA), mobile audio or video player, game console, global positioning system (GPS) receiver, or a portable storage device (such as a universal serial bus (USB) flash drive), only a few examples are named here.

Computer readable media suitable for storage of computer program instructions and data include all forms of non-volatile memory, media, and memory devices, including, for example, semiconductor memory devices (e.g., EPROM, EEPROM, and flash memory devices), magnetic disks (e.g., internal hard disks or removable discs), magneto-optical discs, and CD-ROM and DVD-ROM discs. The processor and memory may be supplemented by or incorporated in special purpose logic circuitry.

While the present disclosure contains many specific implementation details, these should not be understood as limiting the scope of any invention or what may be claimed, but are used primarily to describe features of specific embodiments of particular inventions. Certain features that are described in the present disclosure in multiple embodiments can also be implemented in combination in a single embodiment. On the other hand, various features that are described in the context of a single embodiment can also be implemented in multiple embodiments separately or in any suitable subcombination. Furthermore, although features may function as described above in certain combinations and even be originally claimed as such, one or more features from a claimed combination may in some cases be removed from the combination and the claimed protected combination may point to a subcombination or a variation of a subcombination.

Similarly, although operations in the figures are depicted in a particular order, this should not be construed as requiring that the operations be performed in the particular order shown or sequentially, or that all illustrated operations be performed, to achieve the desired result. In some cases, multitasking and parallel processing may be advantageous. Furthermore, the separation of the various system modules and components in the above-described embodiments should not be construed as requiring such separation in all embodiments, and it should be understood that the described program components and systems may generally be integrated together in a single software product, or packaged into multiple software products.

Thus, specific embodiments of the subject matter have been described. Other embodiments are within the scope of the appended claims. In some cases, the actions recited in the claims can be performed in a different order and still achieve desirable results. Furthermore, the processes depicted in the figures do not necessarily require the particular order shown, or sequential order, to achieve desirable results. In some implementations, multitasking and parallel processing may be advantageous.

The above descriptions are only preferred embodiments of one or more embodiments of the present disclosure, and are not intended to limit one or more embodiments of the present disclosure. Any modifications, equivalent replacements, improvements, etc. made within the spirit and principles of one or more embodiments of the present disclosure should be included within the protection scope of one or more embodiments of the present disclosure.

What is claimed is:

1. A thermostat for a heating, ventilation and air conditioning (HVAC) system, comprising:
   a memory storing machine executable instructions;
   one or more processors, when executing the machine executable instructions, the one or more processors are configured to perform following operations comprising:
   obtaining device information of the HVAC system, and region information of a user's location;
   according to the device information of the HVAC system and the region information, in response to an energy saving mode and a schedule selected by the user, determining a predicted energy consumption and a reference energy consumption, comprising:
   according to the region information, determining reference temperature control ranges for respective working modes and default run durations thereof within a preset period; and
   determining the corresponding reference energy consumption according to the reference temperature control ranges and the default run durations;
   based on the energy saving mode, determining target temperature control ranges for the respective working modes;
   according to the schedule, determining target run durations for respective working modes;
   determining the predicted energy consumption according to said target temperature control ranges and said target run durations;
   wherein the working modes under the energy saving mode comprises home mode, away mode and sleep mode, the operations further comprising: using the thermostat to extend a run duration of the away mode and shortening a run duration of the home mode in response to an energy saving command issued by the user; and
   determining energy saving amount according to the predicted energy consumption and the reference energy consumption.

2. The thermostat according to claim 1, wherein the energy saving mode comprises a low energy saving mode, a medium energy saving mode and a high energy saving mode, wherein for each working mode, a target temperature control range corresponding to the low energy saving mode is less than the one corresponding to the medium energy saving mode, and a target temperature control range corresponding to the medium energy saving mode is less than the one corresponding to the high energy saving mode; and
   the operations further comprising:
   in response to the user selecting the energy saving mode, obtaining the target temperature control range respectively.

3. The thermostat according to claim 1, wherein the energy saving mode comprises a custom energy saving mode; based on the energy saving mode, determining target temperature control ranges for the respective working modes comprises:
   obtaining user-defined differential temperature in response to the user selecting the differential temperature under the custom energy saving mode; and
   adjusting reference temperature control ranges under the respective working modes according to the user-defined differential temperature to obtain target temperature control ranges for the respective working modes under the custom energy saving mode.

4. The thermostat according to claim 1, wherein determining the predicted energy consumption according to said target temperature control ranges and said target run durations comprises:
   determining the predicted energy consumption corresponding to the energy saving mode according to the target temperature control ranges, the target run durations and weights for the respective working modes.

5. The thermostat according to claim 1, wherein the region information comprises first region information entered by the user and second region information determined according to the first region information; wherein the second region information comprises one or more of a climate type, a thermal division, a standard building type or weather information for a region corresponding to the first region information.

6. The thermostat according to claim 1, wherein the device information includes an energy consumption coefficient and a heating coefficient of performance (COP) corresponding to an energy source for driving the HVAC system; determining the predicted energy consumption according to said target temperature control ranges and said target run durations comprises:
   determining the predicted energy consumption according to the target temperature control ranges and the target run durations for respective the working modes, the energy consumption coefficient and the heating COP;
   wherein the energy consumption coefficient is configured to indicate a degree of influence of building thermal parameters on energy consumption at different periods.

7. The thermostat according to claim 6, wherein the operations further comprising:
   determining a heating COP corresponding to an energy source that out of a list of specified energy source according to an energy conversion relationship table.

8. A method for determining an energy saving amount of a heating, ventilation, and air conditioning (HVAC) system, applied to a thermostat or a user terminal, comprising:
   obtaining device information of the HVAC system, and region information of a user's location;
   according to the device information of the HVAC system and the region information, in response to an energy saving mode and a schedule selected by the user, determining a predicted energy consumption and a reference energy consumption, comprising:
   according to the region information, determining reference temperature control ranges for respective working modes and default run durations thereof within a preset period; and
   determining the corresponding reference energy consumption according to the reference temperature control ranges and the default run durations;
   based on the energy saving mode, determining target temperature control ranges for the respective working modes;
   according to the schedule, determining target run durations for respective working modes;
   determining the predicted energy consumption according to said target temperature control ranges and said target run durations;
   wherein the working modes under the energy saving mode comprises home mode, away mode and sleep mode, the method further comprising: using the thermostat to extend a run duration of the away mode and shortening a run duration of the home mode in response to an energy saving command issued by the user; and
   determining energy saving amount according to the predicted energy consumption and the reference energy consumption.

9. The method according to claim 8, wherein the energy saving mode comprises a low energy saving mode, a medium energy saving mode and a high energy saving mode, wherein for each working mode, a target temperature control range corresponding to the low energy saving mode is less than the one corresponding to the medium energy saving mode, and a target temperature control range corresponding to the medium energy saving mode is less than the one corresponding to the high energy saving mode; and the method further comprising:
   in response to the user selecting the energy saving mode, obtaining the target temperature control range respectively.

10. The method according to claim 8, wherein the energy saving mode comprises a custom energy saving mode; based on the energy saving mode, determining target temperature control ranges for the respective working modes comprises:
   obtaining user-defined differential temperature in response to the user selecting the differential temperature under the custom energy saving mode; and
   adjusting reference temperature control ranges under the respective working modes according to the user-defined differential temperature to obtain target temperature control ranges for the respective working modes under the custom energy saving mode.

11. The method according to claim 8, wherein the working modes under the energy saving mode comprises home mode, away mode and sleep mode, the method further comprising:
   extending a run duration of the away mode and shortening a run duration of the home mode in response to an energy saving command issued by the user.

12. The method according to claim 8, wherein determining the predicted energy consumption according to said target temperature control ranges and said target run durations comprises:
   determining the predicted energy consumption corresponding to the energy saving mode according to the target temperature control ranges, the target run durations and weights for the respective working modes.

13. The method according to claim 8, wherein the region information comprises first region information entered by the user and second region information determined according to the first region information; wherein the second region information comprises one or more of a climate type, a thermal division, a standard building type or weather information for a region corresponding to the first region information.

14. The method according to claim 8, wherein the device information includes an energy consumption coefficient and a heating coefficient of performance (COP) corresponding to an energy source for driving the HVAC system; determining the predicted energy consumption according to said target temperature control ranges and said target run durations comprises:
   determining the predicted energy consumption according to the target temperature control ranges the target run durations for respective the working modes, the energy consumption coefficient and the heating COP;
   wherein the energy consumption coefficient is configured to indicate a degree of influence of building thermal parameters on energy consumption at different periods;
   the method further comprising:
   determining a heating COP corresponding to an energy source that out of a list of specified energy source according to an energy conversion relationship table.

15. A non-transitory computer readable storage medium comprising computer program instructions stored thereon, wherein the computer program instructions, when executed by a processor, achieve following operations:
   obtaining device information of the HVAC system, and region information of a user's location;
   according to the device information of the HVAC system and the region information in response to an energy saving mode and a schedule selected by the user, determining a predicted energy consumption and a reference energy consumption, comprising:
   according to the region information, determining reference temperature control ranges for respective working modes and default run durations thereof within a preset period; and
   determining the corresponding reference energy consumption according to the reference temperature control ranges and the default run durations;
   based on the energy saving mode, determining target temperature control ranges for the respective working modes;
   according to the schedule, determining target run durations for respective working modes:
   determining the predicted energy consumption according to said target temperature control ranges and said target run durations;
   wherein the working modes under the energy saving mode comprises home mode, away mode and sleep mode, the operations further comprise: using a thermostat to extend a run duration of the away mode and shortening a run duration of the home mode in response to an energy saving command issued by the user; and determining energy saving amount according to the predicted energy consumption and the reference energy consumption.

\* \* \* \* \*

UNITED STATES PATENT AND TRADEMARK OFFICE
CERTIFICATE OF CORRECTION

| | | |
|---|---|---|
| PATENT NO. | : 11,802,706 B1 | Page 1 of 1 |
| APPLICATION NO. | : 18/100234 | |
| DATED | : October 31, 2023 | |
| INVENTOR(S) | : Ye Zhao, Di Wang and Fei Zhao | |

It is certified that error appears in the above-identified patent and that said Letters Patent is hereby corrected as shown below:

On the Title Page

(72) INVENTORS; after Ye Zhao, Jiangsu (CN), remove Yuejun Yu, Jiangsu (CN)

Signed and Sealed this
Twenty-fifth Day of June, 2024

Katherine Kelly Vidal
*Director of the United States Patent and Trademark Office*